United States Patent
Kurihara (10) Patent No.: US 9,135,406 B2
(45) Date of Patent: Sep. 15, 2015

(54) INFORMATION DELIVERY SYSTEM, DELIVERY CENTER DEVICE, USER TERMINAL DEVICE AND INFORMATION DELIVERY METHOD

(75) Inventor: Shinichi Kurihara, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 2137 days.

(21) Appl. No.: 12/026,577

(22) Filed: Feb. 6, 2008

(65) Prior Publication Data

US 2010/0031018 A1    Feb. 4, 2010

(30) Foreign Application Priority Data

Mar. 20, 2007    (JP) .................. 2007-072362

(51) Int. Cl.
*H04L 29/06* (2006.01)
*G06F 21/10* (2013.01)
*G11B 20/00* (2006.01)
*H04N 21/4627* (2011.01)

(52) U.S. Cl.
CPC .......... *G06F 21/10* (2013.01); *G11B 20/00246* (2013.01); *G11B 20/0021* (2013.01); *H04N 21/4627* (2013.01)

(58) Field of Classification Search
CPC ..................... G11B 20/0021; G11B 20/00115; G11B 20/00478; G11B 20/00347; G11B 2020/1083; G06F 21/10; H04N 21/4627
USPC ....................................................... 713/153
See application file for complete search history.

(56) References Cited

U.S. PATENT DOCUMENTS

| 2001/0004736 A1* | 6/2001 | Hirano et al. ................... 705/51 |
| 2004/0190868 A1* | 9/2004 | Nakano et al. ................... 386/94 |
| 2004/0205028 A1* | 10/2004 | Verosub et al. ................. 705/59 |
| 2005/0021774 A1 | 1/2005 | Kurihara et al. |

(Continued)

FOREIGN PATENT DOCUMENTS

| GB | 2 408 605 A | 6/2005 |
| JP | 2004-350150 | 12/2004 |

(Continued)

OTHER PUBLICATIONS

S. Kurihara, U.S. Appl. No. 11/878,382, filed Jul. 24, 2007.

(Continued)

*Primary Examiner* — Evans Desrosiers
*Assistant Examiner* — Lawrence Cosby
(74) *Attorney, Agent, or Firm* — Finnegan, Henderson, Farabow, Garrett & Dunner, LLP (57) ABSTRACT

A user terminal device specifies presence or absence of additional recording in issuing a content request, and in the case of additional recording, the device transmits medium information and encrypted information of pre-recorded contents to a delivery center. When receiving a content additional recording request from the device, the delivery center decrypts once encrypted contents to be additionally recorded with the corresponding-content keys. The encrypted key information is decrypted by the medium information from the device to decrypt content keys of the pre-recorded contents and re-encrypts encrypted contents to be additionally recorded to deliver the re-encrypted contents to the device. When receiving contents for additional recording, the device records the received contents so as to be related to the pre-recorded contents, on a recording medium.

4 Claims, 3 Drawing Sheets

(56) References Cited

U.S. PATENT DOCUMENTS

| | | |
|---|---|---|
| 2005/0171913 A1 | 8/2005 | Kurihara et al. |
| 2006/0288403 A1 | 12/2006 | Kurihara |
| 2007/0061261 A1 | 3/2007 | Kurihara |
| 2007/0061892 A1 | 3/2007 | Kurihara |
| 2007/0094505 A1* | 4/2007 | Futa et al. .................. 713/176 |
| 2007/0226399 A1* | 9/2007 | So et al. .................. 711/101 |
| 2007/0269045 A1 | 11/2007 | Kurihara et al. |
| 2007/0271186 A1 | 11/2007 | Kurihara et al. |
| 2007/0271187 A1 | 11/2007 | Kurihara et al. |
| 2007/0271386 A1 | 11/2007 | Kurihara et al. |
| 2007/0291305 A1 | 12/2007 | Kurihara |

FOREIGN PATENT DOCUMENTS

| | | |
|---|---|---|
| JP | 2005-159752 | 6/2005 |
| JP | 2006-244603 | 9/2006 |

OTHER PUBLICATIONS

S. Kurihara, U.S. Appl. No. 11/878,383, filed Jul. 24, 2007.

Notification of Reasons for Rejection mailed Jan. 20, 2009, in Japanese Patent Application No. 2007-072362 and English translation of Notice.

* cited by examiner

INFORMATION DELIVERY SYSTEM, DELIVERY CENTER DEVICE, USER TERMINAL DEVICE AND INFORMATION DELIVERY METHOD

CROSS-REFERENCE TO RELATED APPLICATIONS

This application is based upon and claims the benefit of priority from prior Japanese Patent Application No. 2007-072362, filed Mar. 20, 2007, the entire contents of which are incorporated herein by reference.

BACKGROUND OF THE INVENTION

1. Field of the Invention

The present invention relates to information delivery system configured to encrypt information such as video content by electronic data and deliver the information to a user terminal device from a communication delivery device via a network.

2. Description of the Related Art

Recently, as broadband became widely used, services which deliver video content by electronic data in use of communication lines have become popular. In such services, a service, on condition that the service generates an encrypted key by using information specific to a medium such as a medium ID written in a read-only area in an information recording medium, encrypts the video content with the encrypted key to deliver the encrypted video content and uses a specified information recording medium for which a contract has been made among a delivery agent and a user, is made practicable.

More specifically, as regards the video delivery service, a service which encrypts video data by using an information recording medium corresponding to content protection for recordable media (CORM) or an advanced access content system (AACS) and delivers the encrypted video data has become widely used.

In this video content delivery service, the user loads an information recording medium (IC memory card [SD etc.], CD-R, CD-R/W, DVD-R, DVE-R/W, DVD+R, DVD+R/W, DVD-RAM, etc), for which the contract has been made, to user terminal devices, selects either a purchase type which can be permanently viewed like a commercially available DVD package or rental type which can be viewed for a limited time, and instructs delivery of arbitrary video content in a state in which the information specific to the recording medium has become readable. At this moment, the user terminal device presents the information specific to the loaded medium together with the information about the delivery request.

On the other hand, a delivery center device stores a plurality of video contents in a state in which the contents are encrypted with keys different from one another in order to prevent content distribution inside the center device, and manages each key separately from the contents. When receiving the information about the delivery request and the information specific to the loaded medium from the user terminal device, the center device encrypts the key which has encrypted the specified content by using the information specific to the loaded medium, and delivers the encrypted key to a request origin together with the specified content. Meanwhile, the user terminal device downloads the encrypted video content which has been delivered from the center device, decrypts the encrypted key by using the information specific to the loaded medium to be transmitted with the downloading, decrypts the encrypted video content by using the decrypted key and then makes a video viewable (refer, for example, to Jpn. Pat. Appln. KOKAI Publication No. 2004-350150 and Jpn. Pat. Appln. KOKAI Publication No. 2005-159752).

However, in the aforementioned operation form of the conventional video delivery service, when the user additionally records new content to pre-recorded content, both the contents are stored in a state in which the respective contents are encrypted with different keys each other. Therefore, a switching period for the keys is needed in continuous reproduction. In the CPRM, since only one piece of content may be managed for information specific to one medium, the CPRM may not perform additional writing basically. To improve such a problem, it is needed to individually decrypt each content once at each time and encrypt again after connection processing, and this procedure forces the user to treat a heavy load.

As mentioned above, in an information delivery system represented by the conventional video delivery service, since the system utilizes an information recording medium with specific information for copyright protection added thereto and downloads data encrypted in a form, in which the data is related to the recording medium, and stores the data in a recording medium, it is hard to additionally record the encrypted data to be related to the same recording medium, on the pre-recorded medium.

BRIEF SUMMARY OF THE INVENTION

An object of the present invention is to provide an information delivery system configured to easily perform additional recording of encrypted data to be related to the same recording medium on a pre-recorded medium even in an operation form which utilizes an information recording medium with specific information for right protection added thereto, and downloads data encrypted in a form in which the data is related to the recording medium and stores the encrypted data in a recording medium; to provide a delivery center device, a user terminal device, and an information delivery method.

According to the invention, there is provided an information delivery system, comprising: a user terminal device configured to record content information on an information recording medium with medium information at least of a medium-specific identifier and medium key information written thereon or on other information recording media differing from the information recording medium in a state where the information recording medium is loaded; and a delivery center device which selectively delivers a plurality of items of content information to the user terminal device in response to a request, wherein the delivery center device comprises: a management unit which each encrypts the plurality of items of content information with arbitrary content keys to generate encrypted contents and individually manages the generated encrypted contents and the corresponding-content keys; a first encryption processing unit which generates encrypted key information by taking out encrypted content and a content key corresponding to the request from the management unit and by encrypting the content key by using the medium information of the information recording medium simultaneously provided from the user terminal and delivers the encrypted key information together with or separately from the encrypted content to the user terminal device when a content request is issued from the user terminal device; and a second encryption processing unit which takes out the encrypted content and the content key corresponding to the request from the management unit to decrypt the encrypted content, receives the medium information of the information recording medium and encrypted key information of the pre-recorded content simultaneously provided from the user terminal device and decrypts the encrypted key information to decrypt the content key on the basis of the medium information, and re-encrypts the decrypted content with the decrypted content key to deliver the re-encrypted key to the user terminal device when an instruction for additional recording is issued together with the content request from the user terminal device, and the user terminal device comprises: a first processing unit which reads the medium information from the information recording medium to notify the medium information together with the request to the delivery center device and records the encrypted contents and the encrypted key information delivered from the delivery center device on the information recording medium or on other information recording media differing from the information recording medium in a state where the information recording media is loaded, in selectively requesting the plurality of contents to the delivery center device; and a second processing unit which notifies the fact that the requested content is to be additionally recorded on the information recording medium on which the encrypted contents are recorded by the first processing unit, and encrypted key information of the pre-recorded contents together with the request, and records the encrypted contents to be delivered from the delivery center device on the information recording medium with the pre-recorded contents recorded thereon so as to be related to the pre-recorded contents, in selectively requesting the plurality of contents to the delivery center device.

According to the invention, there is provided a delivery center device of an information delivery system which selectively delivers a plurality of items of content information in response to a request to a user terminal device configured to record content information on an information recording medium with at least medium-specific identifier and medium information of medium key information written thereon or other information recording media differing from the information recording media in a state where the information recording media is loaded, comprising: a management unit which encrypts the plurality of items of content information with each arbitrary content key to generate encrypted contents and separately manages the generated encrypted contents and the corresponding-content keys; a first encryption processing unit which generates encrypted key information by taking out encrypted content and a content key corresponding to the request from the management unit and by encrypting the content key by using the medium information of the information recording medium simultaneously provided from the user terminal and delivers the encrypted key information together with or separately from the encrypted content to the user terminal device when a content request is issued from the user terminal device; and a second encryption processing unit which takes out the encrypted content and the content key corresponding to the request from the management unit to decrypt the encrypted content, receives the medium information of the information recording medium and encrypted key information of the pre-recorded content simultaneously provided from the user terminal device and decrypts the encrypted key information to decrypt the content key on the basis of the medium information, and re-encrypts the decrypted content with the decrypted content key to deliver the re-encrypted key to the user terminal device when an instruction for additional recording is issued together with the content request from the user terminal device.

According to the invention, there is provided a user terminal device of an information delivery system configured to record content information on an information recording medium with medium information at least of medium-specific identifier and medium key information written thereon or on other information recording media differing from the information recording medium in a state where the information recording medium is loaded and to selectively require a plurality of items of content information to receive delivery of the content information from the delivery center device, wherein: when the delivery center device generates encrypted contents by encrypting the plurality of items of content information with each arbitrary content key, separately manages the generated encrypted contents and the corresponding-content keys, takes out the encrypted content and the content key corresponding to a content request when the request is issued, generates encrypted key information by encrypting the content key in use of medium information of the information recording medium simultaneously provided with the request, delivers the encrypted key information to a request origin together with or separately from the encrypted contents, takes out the encrypted content and the content key corresponding to the request to decrypt the encrypted content when an instruction for additional reading is issued together with the content request, receives medium information of the information recording medium and encrypted key information of the pre-recorded contents simultaneously provided with the request and decrypts the encrypted key information on the basis of the medium information to decrypt the content key, and re-encrypts the decrypted content with the decrypted content key to deliver the decrypted content to a request origin, the user terminal device comprising: a first processing unit which reads the medium information from the information recording medium to notify the medium information together with the request to the delivery center device and records the encrypted contents and the encrypted key information delivered from the delivery center device on the information recording medium or on other information recording media differing from the information recording medium in a state where the information recording media is loaded when selectively requesting the plurality of items of content to the delivery center device; and a second processing unit which notifies the fact that the requested content is to be additionally recorded on the information recording medium on which the encrypted contents are recorded by the first processing unit, and encrypted key information of the pre-recorded contents together with the request, and records the encrypted contents to be delivered from the delivery center device on the information recording medium with the pre-recorded contents recorded thereon so as to be related to the pre-recorded contents when selectively requesting the plurality of items of content to the delivery center device.

According to the invention, there is provided an information delivery method of an information delivery system for use in an information system, comprising: a user terminal device configured to record content information on an information recording medium with medium information at least of medium-specific identifier and medium key information written thereon or on other information recording media differing from the information recording medium in a state where the information recording medium is loaded; and a delivery center device which selectively delivers a plurality of items of content information to the user terminal device in response to a request, wherein the delivery center device encrypts the plurality of items of content information by each arbitrary content key to generate encrypted contents and separately manages generated encrypted contents and the corresponding-content keys, takes out encrypted content and a content key corresponding to a content request, generates encrypted key information by encrypting the content key in use of medium information of simultaneously provided from the user terminal device, delivers the encrypted key information together with or separately from encrypted content when the content request is issued from the user terminal device, takes out encrypted content and a content key corresponding to a content request, decrypts the encrypted content with the corresponding-content key, receives medium information of the information recording medium and the encrypted key information of the pre-recorded contents simultaneously provided from the user terminal device, decrypts the encrypted key information to decrypt the content key on the basis of the medium information, re-decrypts the decrypted contents with the decrypted content key to deliver the re-encrypted contents when an instruction of additional recording is issued from the user terminal together with the content request, and the user terminal device reads the medium information from the information recording medium to notify the medium information together with the request to the delivery center device and records the encrypted contents and the encrypted key information delivered from the delivery center device on the information recording medium or on other information recording media differing from the information recording medium in a state where the information recording media is loaded when selectively requests the plurality of items of content to the delivery center device; and notifies the fact that the requested content is to be additionally recorded on the information recording medium on which the encrypted contents are recorded by the first processing unit, and encrypted key information of the pre-recorded contents together with the request, and records the encrypted contents to be delivered from the delivery center device on the information recording medium with the pre-recorded contents recorded thereon so as to be related to the pre-recorded contents when selectively requests the plurality of items of content to the delivery center device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described in detail with reference to the drawings.

Figure 1:
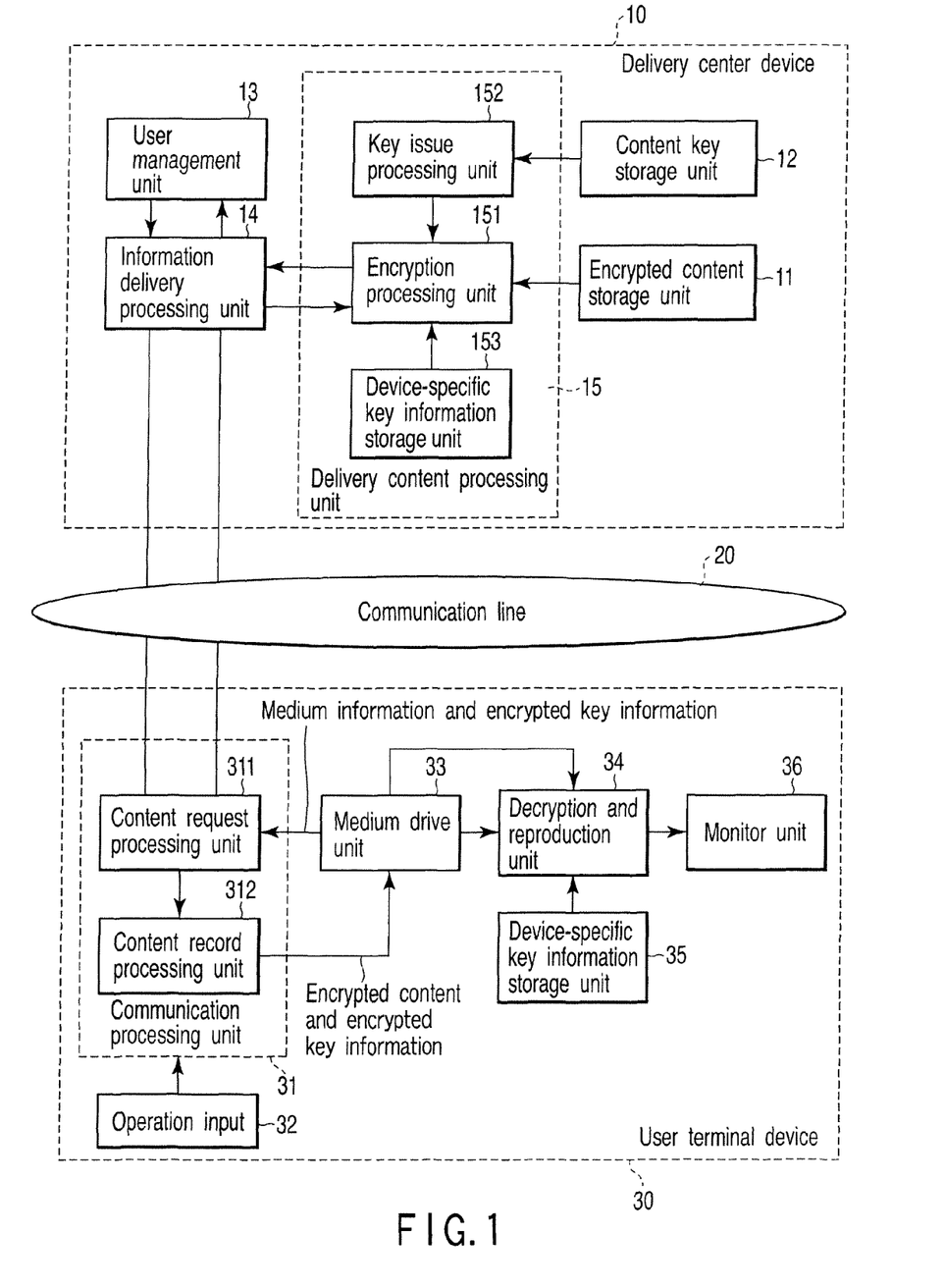
FIG. 1 is a block diagram depicting an embodiment in providing a video delivery service as an information delivery system regarding the invention.

FIG. 1 shows a block diagram illustrating an embodiment in providing a video delivery service as an information delivery system regarding the invention. In FIG. 1, the delivery system includes a delivery center device 10 which manages user information and encrypts video content to be required to delivery the encrypted video content; a communication line 20, and a user terminal device 30 which accesses the center device 10 via the communication line 20 to download the encrypted video content, also receives key information so as to decrypt the encrypted video content and decrypts the encrypted video content in accordance with the key information to present the decrypted video content to a user.

The center device 10 includes an encrypted content storage unit 11 and a content key storage unit 12. That is, a plurality of video contents for delivery are encrypted with the key information individually given in advance to be each stored in content storage unit 11. Other than this, content keys which have been each used for encrypting the plurality of contents are stored in the key storage unit 12. Like this, the center device 10 separately manages the video contents and the content keys, and even if the encrypted contents leak from inside, enhances copyright protection by preventing the content keys from being taken out.

The delivery center device 10 includes a user management unit 13 and an information delivery processing unit 14. The user management unit 13 registers user information acquired depending on a preliminarily applied application, authenticates for the accessed user on the basis of the registered information and manages delivery content. The delivery processing unit 14 receives a data request to be transmitted from the user terminal device 30 via the communication line 20 and performs authentication processing by cooperating with the user management unit 13 in requesting. When receiving its authentication approval, the delivery processing unit 14 requires a specification of request content, presentation of medium information (details will be mentioned below), presence or absence of additional recording, and presentation of encrypted keys of pre-recorded contents in the case of presence of the additional recording. When receiving each item of request information, the delivery processing unit 14 transfers the received request information to instruct issue of the corresponding-content, etc. In response to this instruction, if the content etc. is issued, the delivery processing unit 14 delivers the content etc., to the user terminal device 30.

A delivery content processing unit 15 reads the encrypted content corresponding to the content requested from the user from the encrypted content storage unit 11 to set in an encryption processing unit 151. The content processing unit 15 reads the content key used for encrypting the encrypted content from the key storage unit 12 to set the content key in a key issue processing unit 152. The content processing unit 15 reads the corresponding-device specific key information from device-specific information (key information to be generated on the basis of specific information to be granted for each user terminal device) to be registered in a device-specific key information storage unit 153 in advance to set the device-specific key information in the encryption processing unit 151.

The encryption processing unit 151 determines the presence or absence of the additional recording, and if the additional recording is not present, transfers the encrypted content which has been read from the encrypted content storage unit 11 to the information delivery processing unit 14 as it is also receives the content key used for encrypting the encrypted content from the key issue processing unit 152, encrypts the received content key itself by using the information with the device-specific key information and the medium information from the user combined therein as a key to transfer the encrypted content key to the delivery processing unit 14. In contrast, if the additional recording is present, the encryption processing unit 151 receives the medium information and the encrypted key from the user and decrypts a content key for additional recording from the encrypted key on the basis of the medium information and the device-specific key information. The encryption processing unit 151 decrypts the encrypted content read from the encryption content storage unit 11 with the content key issued from the key issue processing unit 152 and re-encrypts the decrypted content with the content key for additional recording decrypted previously to transfer the re-encrypted content to the delivery processing unit 14.

As given above, in the case of absence of additional recording (namely, new content), the delivery center device 10 delivers the encrypted content and the encrypted key which is made by encrypting the content key corresponding to the encrypted content, and in the case of presence of the additional recording, the center device 10 re-encrypts the encrypted content with the content key to be decrypted from the provided encrypted key to deliver the re-encrypted content.

Meanwhile, the user terminal device 30 comprises a communication processing unit 31 which performs data communication with the delivery center device 10; an operation input unit 32 which receives a content delivery request and an operation input for information of presence or absence of additional recording from the user; a medium drive unit 33 which records and reproduces an information recording medium (e.g., DVD-RW) corresponding to the CPRM; a decryption and reproduction unit 34 which decrypts the encrypted content to be reproduced from a medium drive unit 33 to reproduce and output the decrypted content; a device-specific key information storage unit 35 which stores the device-specific key information to be provided for decrypting the encryption; and a monitor unit 36 which presents the content reproduced by the decryption and reproduction unit 34.

The communication processing unit 31 includes a content request processing unit 311 and a record processing unit 312. When receiving an operation input instruction of a content delivery request by the user from the operation input unit 33, the request processing unit 311 accesses to the delivery center device 10 to receive user authentication and also starts the medium drive unit 33, reads recorded identification information specific to a medium (hereinafter, referred to as medium information) from a medium loaded in the corresponding-drive unit 33 (hereinafter, referred to as the loaded medium), and transmits the medium information to the center device 10 together with the content delivery request and the information of the presence or absence of the additional recording. At this moment, if an instruction for additional recording is issued from the operation input unit 32, the request processing unit 311 also reads the encrypted key of the pre-recorded contents to also transmit the encrypted keys to the center device 10.

When receiving the delivery of encrypted content and its encrypted key for the content delivery request from the center device 10, the record processing unit 311 transmits them to the medium drive unit 33 to record them on the loaded medium. When the delivery request specifies the additional recording, the processing unit 311 transmits the encrypted content to be delivered from the center device 10 to the medium drive unit 33 and records the encrypted content on the loaded medium so as to be related to the pre-recorded contents.

The medium drive unit 33 reads the specified content, the encrypted key corresponding to the specified content and the medium information from the loaded medium to transfer them to the decryption and reproduction unit 34 in response to the instruction for specifying and starting reproduction of the reproduction content from the operation input unit 32. The decryption and reproduction unit 34 takes out the content key by decrypting the encrypted key in the use of the medium information and the device-specific key information to be stored in the device-specific key information storage unit 35, decrypts the encrypted content with the content key and reproduces to output the decrypted content to the monitor 36.

In the foregoing configuration, the following will describe each concrete processing procedure of the delivery center device 10 and the user terminal device 30.

Figure 2:
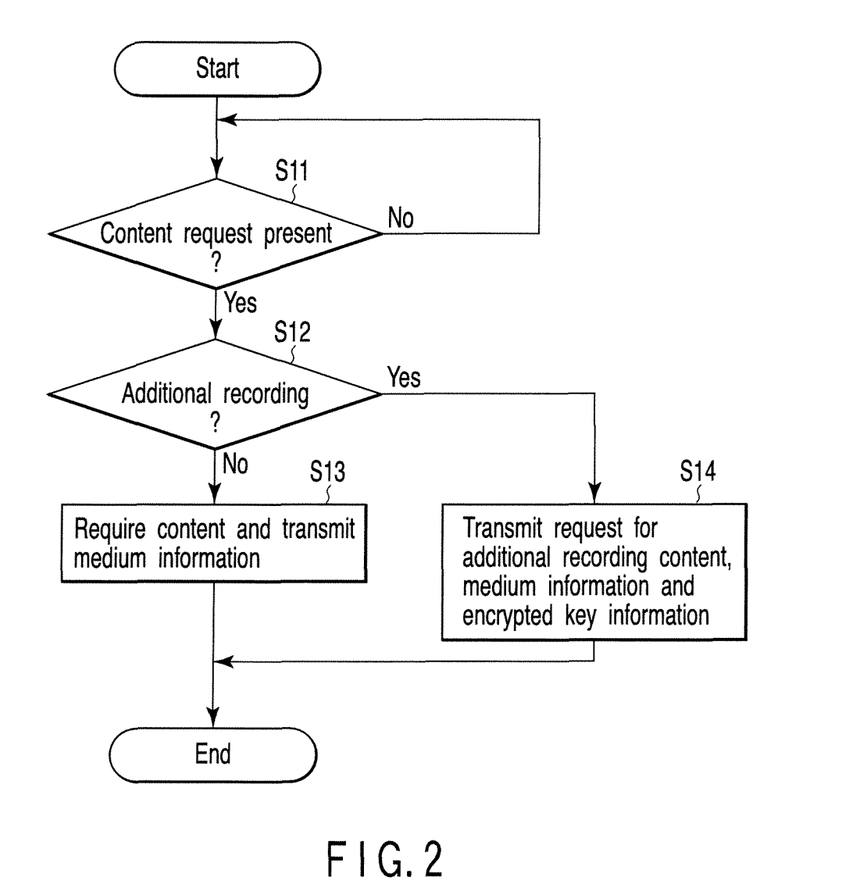
FIG. 2 is a flowchart depicting a processing procedure of a communication processing unit of the user terminal device depicted in FIG. 1.

FIG. 2 shows a flowchart illustrating a processing procedure of the communication processing unit 31 when the instruction requesting for the content is input in the delivery center device 10 in the aforementioned user terminal device 30. At first when the instruction requesting for the content is issued from the operation input unit 32 (Step S11), the processing unit 31 determines whether or not any additional recording is specified in the instruction information (Step S12), if the additional recording is not specified, the processing unit 31 requires the specified content and also reads the medium information from the loaded medium to transmits the medium information to the center device 10 (Step S13). If it is determined that the additional recording is specified, the processing unit 31 reads the medium information and the encrypted key information for the pre-recorded content from the loaded medium to transmit both the information to the center device 10 together with the request for the content to be additionally recorded (Step S14).

Figure 3:
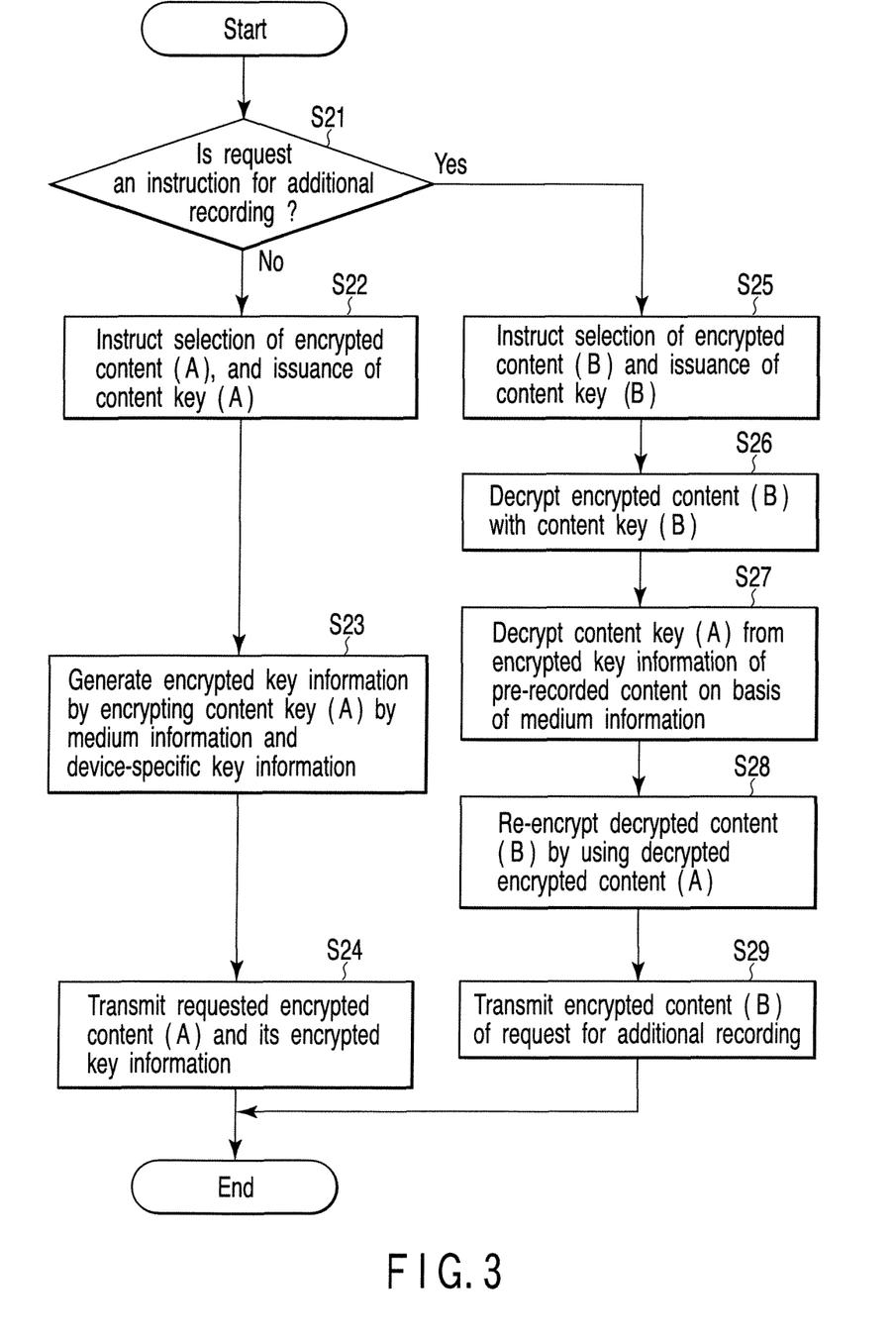
FIG. 3 is a flowchart depicting a processing procedure of an encryption processing unit of the delivery center device depicted in FIG. 1.

FIG. 3 shows a flowchart illustrating a processing procedure of the encryption processing unit 151 in the case of presence of the content request from the user terminal device 30 in the delivery center device 10. At first, when the content request is issued from the terminal device 30, the processing unit 151 determines whether or not the request includes the instruction of the additional recording (Step S21), and when the request does not include the instruction thereof, the processing unit 151 instructs selection of encrypted content (A) to be requested, and instructs issuance of a content key (A) to decrypt the encrypted content (A) (Step S22). In succession, the processing unit 151 encrypts the content key (A) in accordance with the medium information to be transmitted from the user terminal device 30 and with the device-specific key information to be stored in the device-specific key information storage unit 153 to generate the encrypted key information (A) (Step S23), and delivers the key information (A) to the terminal device 30 together with the encrypted content (A) to be requested which has been obtained in Step S22.

On the contrary, if it is determined that the request includes the instruction of the additional recording in Step S21, the encryption processing unit 151 instructs selection of encrypted content (B) to be additionally recorded, and instructs issuance of a content key (B) in order to decrypt the encrypted content (B) (Step S25). Next, the processing unit 151 decrypts the encrypted content (B) once with the content key (B) (Step S26), and also decrypts the content key (A) on the basis of the medium information received from the terminal device 30 and the device-specific key information to be stored in a device-specific key information storage unit 153 (Step S27). The processing unit 151 re-encrypts the decrypted content (B) with the decrypted content key (A) (Step S28), and delivers only the encrypted content (B) as an object of a request for additional recording to the user terminal device 30

(Step S29) (since the encrypted key is owned on the side of the user terminal device 30, there is no need to transmit the encrypted key).

According to the given processing, in the case of requesting new content, the user terminal device 30 receives the encrypted key information (A) together with the encrypted content (A) to be required from the delivery center device 10 to record both the content (A) and the key information (A) in the recording medium. In the case of requesting for the additionally recorded content, the terminal device 30 receives the encrypted content (B) to be requested for additional recording from the delivery center device 10 to record the content (B) on the recording medium so as to be related to the pre-recorded contents. As a result, in reproduction, since the additionally recorded content (B) is decrypted with the same content key as the pre-recorded content (A), the problem that an interruption is generated due to replacement of the keys in the middle of reproduction may be eliminated.

While the foregoing embodiment has described to record the encrypted content on the medium which has presented its medium information and to record the encrypted key information on the same recording medium as a recording destination of the encrypted content, as long as the recording medium which has provided its medium information is set, even if the recording destination differs from a provision origin of the medium information, because medium information about a secure digital (SD) card memory as a recording medium corresponding to the CPRM is provided, and the encrypted content and the encrypted key information are recorded on a hard disk or a DVD-RW, since the medium information may be extracted, no substantive problem is produced.

The present invention does not need to always deliver the encrypted content and the encrypted key information together with each other, and even when delivers the encrypted keys every time in response to the reproduction request for the recorded content the same operation of the delivery system may be implemented.

Other than this, it is our intention that the invention is not limited to the specific details and representative embodiments shown and described herein, and in an implementation phase, this invention may be embodied in various forms without departing from the spirit or scope of the general inventive concept thereof. Various types of the invention can be formed by appropriately combining a plurality of constituent elements disclosed in the foregoing embodiments. Some of the elements, for example, may be omitted from the whole of the constituent elements shown in the embodiments mentioned above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information delivery system, comprising:
a user terminal device configured to record content on a first recording medium with medium information of a medium-specific identifier written thereon or to record content on a second recording medium that is different from the first recording medium in a state where the first recording medium is loaded; and
a delivery center device which delivers requested content from a plurality of items of content to the user terminal device, wherein the delivery center device comprises:
a management apparatus which manages a plurality of encrypted contents obtained by encrypting the plurality of items of content by means of different content keys used for the encryption, wherein the plurality of encrypted contents are stored in a first storage unit, the content keys are stored in a second storage unit, and the plurality of encrypted contents are managed separately from the content keys by the management apparatus;
an encryption processor that when a request for content is made from the user terminal device, receives the medium information from the user terminal device, retrieves encrypted content and a content key which corresponds to the requested content from the management apparatus and encrypts the content key by using the medium information, thereby generating encrypted key information; and
a delivery apparatus which delivers the encrypted key information together with or separately from the encrypted content to the user terminal device,
wherein when the request for content includes an instruction for recording additional content, the encryption processor retrieves the encrypted content and the content key which corresponds to the requested content from the management apparatus, decrypts the encrypted content, receives an encrypted key associated with content pre-recorded at the user terminal device and the medium information from the user terminal device, decrypts the encrypted key received from the user terminal device on the basis of the medium information, and re-encrypts the decrypted content using the decrypted key, and
wherein the delivery apparatus delivers the re-encrypted content to the user terminal device when the instruction for recording additional content is made, and
the user terminal device comprises:
a notification apparatus that, when a request for the content is made to the delivery center device, reads out the medium information from the first recording medium and transmits the medium information together with the request; and
a recording processor which records the encrypted content and the encrypted key information that are received from the delivery center device on the first recording medium or the second recording medium,
wherein when a request for recording additional content is made to the delivery center device, the notification apparatus transmits an instruction that the requested content is to be additionally recorded to pre-recorded content that has been previously received and the encrypted key associated with the pre-recorded content together with the request, and
wherein the recording processor records there-encrypted content received from the delivery center device on the first recording medium with the pre-recorded content recorded thereon in such a manner that the re-encrypted content follows the pre-recorded content.

2. A delivery center device of an information delivery system which delivers requested content from a plurality of items of content to a user terminal device configured to record content on a first recording medium with medium information of a medium-specific identifier written thereon or to record content on a second recording medium that is different from the first recording medium in a state where the first recording medium is loaded, comprising:

a management apparatus which manages a plurality of encrypted contents obtained by encrypting the plurality of items of content by means of different content keys used for the encryption, wherein the plurality of encrypted contents are stored in a first storage unit, the content keys are stored in a second storage unit, and the plurality of encrypted contents are managed separately from the content keys by the management apparatus;

an encryption processor that, when a request for content is made from the user terminal device, receives the medium information from the user terminal device, retrieves encrypted content and a content key which corresponds to the requested content from the management apparatus and encrypts the content key by using the medium information, thereby generating encrypted key information; and a delivery apparatus which delivers the encrypted key information together with or separately from the encrypted content to the user terminal device, wherein when the request for content includes an instruction for recording additional content, the encryption processor retrieves the encrypted content and the content key which corresponds to the requested content from the management apparatus, decrypts the encrypted content, receives an encrypted key associated with content pre-recorded at the user terminal device from the user terminal device, decrypts the encrypted key received from the user terminal device on the basis of the medium information, and re-encrypts the decrypted content using the decrypted key, and wherein the delivery apparatus delivers the re-encrypted content to the user terminal device when the instruction for recording additional content is made.

3. A user terminal device of an information delivery system configured to record content on a first recording medium with medium information of a medium-specific identifier written thereon or to record content on a second recording medium that is different from the first recording medium in a state where the first recording medium is loaded, and receive and record the content delivered from the delivery center device in accordance with a request, wherein the delivery center device manages a plurality of encrypted contents obtained by encrypting a plurality of items of content by means of different content keys used for the encryption, wherein the plurality of encrypted contents are stored in a first storage unit, the content keys are stored in a second storage unit, and the plurality of encrypted contents are managed separately from the content keys by the delivery center device, and wherein when a request for content is made, the delivery center device receives the medium information from the user terminal device, retrieves an encrypted content and a content key which correspond to the requested content, encrypts the content key by using the medium information, thereby generating encrypted key information, and delivers the encrypted key information together with or separately from the encrypted content to the user terminal device, and wherein when the request for content includes an instruction for recording additional content, the delivery center device retrieves the encrypted content and a content key which correspond to the requested content, decrypts the encrypted content, receives an encrypted key associated with content pre-recorded at the user terminal device and the medium information from the user terminal device, decrypts the encrypted key received from the user terminal device on the basis of the medium information, re-encrypts the decrypted content by using the decrypted key, and delivers the re-encrypted content to the user terminal device, the user terminal device comprising:

a notification apparatus that, when a request for the content is made to the delivery center, reads out the medium information from the first recording medium and transmits the medium information together with the request; and a recording processor which records the encrypted content and the encrypted key information that are received from the delivery center device on the first recording medium or the second recording medium, wherein when a request for recording additional content is made to the delivery center device, the notification apparatus transmits an instruction that the requested content is to be additionally recorded on the first recording medium on which the encrypted content has been pre-recorded and the encrypted key associated with the pre-recorded content together with the request, and wherein the recording processor records the encrypted content received from the delivery center device on the first recording medium with the pre-recorded content recorded thereon in such a manner that the encrypted content follows the pre-recorded content.

4. An information delivery method of an information delivery system, comprising:

recording content at a user terminal device on a first recording medium with medium information of a medium-specific identifier written thereon or recording content on a second recording medium that is different from the first recording medium in a state where the first recording medium is loaded;

at a delivery center device, delivering requested content from a plurality of items of content to the user terminal device and managing a plurality of encrypted contents obtained by encrypting the plurality of items of content by means of different content keys used for the encryption, wherein the plurality of encrypted contents are stored in a first storage unit, the content keys are stored in a second storage unit, and the plurality of encrypted contents are managed separately from the content keys by the delivery center device;

at the delivery center device, receiving a request for content and the medium information from the user terminal device, retrieving encrypted content and a content key which correspond to the requested content, encrypting the content key by using the medium information, thereby generating encrypted key information, and delivering the encrypted key information together with or separately from the encrypted content to the user terminal device;

wherein, at the delivery center device, when an instruction for recording additional content is received along with the request for the content, retrieving encrypted content and a content key which correspond to the requested content, decrypting the encrypted content by using the content key, receiving an encrypted key associated with a content pre-recorded at the user terminal device and the medium information from the user terminal device, decrypting the encrypted key received from the user terminal device on the basis of the medium information, re-encrypting the decrypted content by using the decrypted key, and delivering the re-encrypted content information to the user terminal device;

at the user terminal device, sending a request for the content information to the delivery center device, reading out the medium information from the information recording medium and transmitting the medium information together with the request, recording the encrypted content and the encrypted key information that are received from the delivery center device on the first recording medium or the second recording medium; and at the user terminal device, transmitting an instruction that requested content is to be additionally recorded to pre-recorded content that was previously received and the encrypted key associated with the pre-recorded content together with the request, and recording the re-encrypted content received from the delivery center device on the first recording medium with the pre-recorded content recorded thereon in such a manner that the re-encrypted content follows the pre-recorded content.

* * * * *

UNITED STATES PATENT AND TRADEMARK OFFICE
CERTIFICATE OF CORRECTION

| | | |
|---|---|---|
| PATENT NO. | : 9,135,406 B2 | Page 1 of 1 |
| APPLICATION NO. | : 12/026577 | |
| DATED | : September 15, 2015 | |
| INVENTOR(S) | : Kurihara | |

It is certified that error appears in the above-identified patent and that said Letters Patent is hereby corrected as shown below:

In the Claims

Claim 1, column 10, lines 56-57, change "there-encrypted content" to --the re-encrypted content--.

Signed and Sealed this
Fifteenth Day of March, 2016

Michelle K. Lee
*Director of the United States Patent and Trademark Office*